United States Patent [19]

Chambers

[11] 4,089,831

[45] May 16, 1978

[54] COMPOSITION AND METHOD FOR DISPERSING FLOCCULANT POLYMERS

[75] Inventor: Byron C. Chambers, Wauconda, Ill.

[73] Assignee: Chemed Corporation, Cincinnati, Ohio

[21] Appl. No.: 788,703

[22] Filed: Apr. 19, 1977

Related U.S. Application Data

[63] Continuation-in-part of Ser. No. 630,869, Nov. 11, 1975.

[51] Int. Cl.² .............................................. C08L 33/26
[52] U.S. Cl. ................................ 260/29.6 SQ; 209/5; 210/54; 252/8.5 A; 260/29.6 HN; 260/29.6 H; 260/29.6 M; 260/29.6 Z

[58] Field of Search ............... 260/29.6 SQ, 29.6 HN, 260/29.6 H, 29.6 M, 29.6 Z; 252/8.5 A; 209/5; 210/54 C, 54 R

[56] References Cited

U.S. PATENT DOCUMENTS

| | | | |
|---|---|---|---|
| 3,402,137 | 9/1968 | Fischer et al. | 260/29.6 HN |
| 3,657,182 | 4/1972 | Jolly | 260/29.6 SQ |
| 3,817,891 | 6/1974 | Keas | 260/29.6 E |
| 3,839,500 | 10/1974 | Dexter | 260/874 |
| 3,860,526 | 1/1975 | Corbett | 252/181 |

*Primary Examiner*—M. J. Welsh
*Attorney, Agent, or Firm*—Charles L. Harness

[57] ABSTRACT

This invention provides an improved composition and method for dispersing high molecular weight flocculant polymers and copolymers used for water and waste treatment by the combination of the polymer with an inert additive and a small amount of water.

14 Claims, No Drawings

COMPOSITION AND METHOD FOR DISPERSING FLOCCULANT POLYMERS

This application is a continuation-in-part of co-pending application Ser. No. 630,869, filed Nov. 11, 1975.

The present invention relates to a new improved composition and method for dispersing high molecular weight flocculant polymers and copolymers in water. More particularly, the present invention provides means for treating water and waste systems using flocculants whose initial rate of dissolving in solution is lowered which thereby increases the ultimate formation of final solution.

It is well known in the art that high molecular weight polymers, i.e. flocculants, with molecular weights in the range of about one to about twenty million, are very difficult to disperse or dissolve in water, when preparing feed solutions. In dissolving such polymers for use in water treatment, conventionally, dry powdered polymer is fed slowly and carefully into the vortex of a vigorously stirred body of water. However, it is frequently difficult to do this in actual operation for a number of reasons. Often, for example, personnel tend to simply dump the powder into the water, start up the stirrer, and expect the material to dissolve. Under such circumstances, the polymers swell and ballup into extremely viscous masses, with dry and unswollen material inside which the water cannot even reach to dissolve. Many undissolved so-called "fish eyes" result which may be seen floating in the water. Under normal circumstances it is impossible to get such a floating mass to completely dissolve even after hours or even days of stirring. For this reason, a considerable amount of work has been done attempting to develop improved and useful methods for producing dispersions and solutions of high molecular weight flocculant polymers in water. Sometimes the dry powdered polymer is wetted with a water soluble organic solvent, or it may be wetted with a surface active material in an attempt to improve the penetration into the particles, at the same time acting to separate them. (See, for instance, Dexter, U.S. Pat. No. 3,839,500 and Keas, U.S. Pat. No. 3,817,891). Considerable fractions of water soluble inert salts, such as sodium chloride, may be used in order to separate the particles of polymer and reduce their tendency to ball up into insoluble masses. Mechanical feed devices and educators operated by flowing water have been described in the prior art and are commercially used for this purpose. Sometimes such devices work well with cold water but may give considerable difficulty when used with hot water.

The present invention is based upon the discovery that certain types of ingredients when blended with the flocculant polymer produce a network (or bridging) which retards rather than accelerates wetting of the polymer particles. This invention is based on the principle that the rate of solution of the flocculant polymer particle in water decreases with decreasing polymer particle surface area. The slower the initial rate of solution, the fewer the insoluble polymer masses formed in the final solution.

In the compositions used for practice of the present invention, the particle size is temporarily increased in order to significantly decrease the initial rate of solution. This yields a polymer particle which is initially completely insoluble and allows the polymer particles to become completely separated and dispersed in the water prior to the process of solution. This particle cannot begin to dissolve until the particles are completely dispersed in the water to form the proper solution network.

According to this invention, the polymer particle and inert ingredients are compounded with small amounts of water to form rigid bridged networks of polymer and inert ingredients. These bridged particles are insoluble in water until the bonds are broken between the polymer particles and the inert ingredients. These bonds do not break until the particles are completely dispersed in water.

The polymers and copolymers, i.e., flocculants, which may be used in this invention can be cationic, anionic or nonionic. Commercially available polymers and copolymers of acrylamide, polystyrene sulfonate, polyethylene oxide, and the like, having polymer molecular weights of about 0.1 to 20 million are found useful.

Inert ingredients include materials such as sodium chloride, sodium sulfate (anhydrous), soda ash, sodium sulfite, magnesium sulfate and sodium bisulfate. The water may be added in the liquid, vapor or gaseous form.

Polymers and copolymers which may be used in the practice of this invention include, for example, polymers and copolymers of acrylamide or methacrylamide, the water soluble salts of acrylic and/or methacrylic acid and copolymers with cationic polyacrylates such as dialkylaminoalkyl acrylates or methacrylates or quaternized dialkylaminoalkyl acrylates or methacrylates and also copolymers with vinylic monomers.

The copolymers of acrylamide and acrylates may be prepared by copolymerization of the monomers or by partial hydrolysis of the polyacrylamide after polymerization. Other polymerizable vinyl compounds such as vinyl acetate, acrylonitrile, methacrylonitrile, vinyl alkyl ethers, vinyl halides and the like may be employed as secondary or ternary components of the polymer to impart desired properties to the product.

Based on 100 parts by weight of flocculant polymer, the inert ingredients are added in an amount from about 10% to about 80% by weight and desirably about 40% to about 60% by weight. On the same basis, the amount of water may vary from about 0.1% by weight to about 20% by weight and desirably about 1% to about 10% by weight.

For purposes of providing an example, a formulation which will exemplify the operation of this patent, without limitation to the particular components and proportions listed is as follows wherein all parts are given by weight unless otherwise indicated:

EXAMPLE 1

| INGREDIENTS | PARTS BY WEIGHT |
|---|---|
| 1. Dow Separan MG-700, an anionic polyacrylamide | 100 |
| 2. Light soda ash | 50 |
| 3. Water | 5.0 |

The first and second items are to be blended well together in a ribbon blender or similar equipment and then the third item is added and blended.

If, to make a 1 percent solution of Dow Separan MG-700 in water, the weighed powder were simply dumped in the stirred water, it would ball up and produce lumps and "fish-eyes" which would take days to dissolve. If the same amount of Separan MG-700 were to be slowly and carefully dusted into the vortex produced by vigorous stirring in a solution tank, the material would dissolve but it would take several hours to do so and there might still be "fish-eyes". If one takes the combination described under Example 1 to make a 1% solution, the mixture may be simply dumped into the water. There will be no clumping, the material will disperse separately throughout the stirred water and the particles will slowly dissolve in the water taking about as much time to dissolve as they would if slowly and carefully dusted in, but without "fish-eyes", and without the need to take time and labor for the careful feeding operation. Even working with eductors, automatic feeders, invert emulsion systems, etc., it is easier to make a solution with a minimum amount of labor using the type of product produced by the practice of this patent.

The solutions so prepared, of course, may be used for any purpose for which polyelectrolytes are usually needed: sludge dewatering, coagulation or flocculation, etc. Among the advantages which are obtained by the practice of this patent are: reduction in maintenance and down time, since there is less chance of producing thick coatings and deposits of undissolved material in the dissolving tanks which would have to be cleaned out by hand; an increase in process capacity because of the ease and speed of preparing the feed solution; more concentrated feed solutions can be prepared if necessary; and lower addition costs since the labor costs are greatly reduced.

It is to be understood that the practice of this invention is not limited to the specific example given but may cover any effective equivalent composition.

Modifications and additions familiar to those skilled in the art which do not interfere with the basic improvement embodied in this patent, namly; the slowing down of the solution of the polymer in order to provide dispersion of separate particles, will be construed as falling under the specifications of this patent.

The product of this invention is a free-flowing powder and is preferably prepared by blending together in intimate admixture the polymer ingredient in the form of free-flowing powder, and the inert additive, followed by blending in the water, so that the final admixture is still a free-flowing powder. The latter form is essential for rapid dispersion on addition to bulk water. During such addition, the mix at first quickly disperses, and following this the dispersed polymer, if it is water soluble, begins to dissolve. Dissolution of the dispersed polymer is soon complete.

I am aware of U.S. Pat. No. 3,860,526 to Corbett. That patent teaches briquetting mixes like mine. The briquette or block is placed in bulk water, the solid breaks down slowly, and the polymer is released at a steady rate into the water. Considerable time elapses before the block is completely used up and all the polymer is dispersed. In contrast, by use of a free-flowing powder, as herein described, dispersion of the polymer is accomplished nearly as fast as the powder is stirred into the bulk water. Our objectives are thus diametrically opposed. Corbett deliberately avoids immediate dispersion with his invention, whereas I achieve it with mine.

My finished products have approximately the following screen analyses:

| Mesh | Broad range, % | Preferred range, % |
| --- | --- | --- |
| Through 200 | 0.01 – 40 | 0.1 – 25 |
| on 200, through 48 | 0.05 – 60 | 0.5 – 31 |
| on 48, through 24 | 0.10 – 50 | 1 – 25 |
| on 24 | 0.1 – 40 | 1 – 20 |

What is claimed is:

1. A free-flowing powder composition for preparing solutions of high molecular weight polymers or copolymers, such solutions to be used in treating water and waste systems, which consists essentially of a combination of flocculant polymers or copolymers blended with an inert additive and a small amount of water; wherein based on weight of flocculant, the inert additive is about 10 percent to 80 percent and the amount of water is about one-tenth percent to twenty percent; said composition, when added to water, producing slowing of the rate of solution of the flocculant, allowing time for dispersion and separation of the solid particles, thereby expediting final solution and preventing the formation of agglomerates of the polymers or copolymers.

2. The composition of claim 1 wherein the flocculant is selected from the group consisting of polyacrylamide, polystyrene sulfonate, or polyethylene oxide having a molecular weight of about 0.1 to about 20 million.

3. The composition of claim 1 wherein the inert additive is selected from the group consisting of sodium chloride, sodium sulfate, soda ash, magnesium sulfate, and sodium bisulfate.

4. The composition of claim 1 wherein the small amount of water is added to the flocculant in the liquid or gaseous form.

5. The composition of claim 1 wherein the flocculant is selected from the group consisting of polyacrylamide, polymethacrylamide, the water soluble salts of polyacrylic or polymethacrylic acid, and copolymers of acrylamide or methacrylamide with acrylates or with vinylic monomers.

6. The composition of claim 1 wherein a flocculant copolymer is prepared from a monomer selected from the group consisting of acrylamide and acrylates by copolymerization of the monomers, or is a copolymer of acrylamide or an acrylate with a vinyl compound selected from the group consisting of vinyl acetate, acrylonitrile, methacrylonitrile, vinyl alkyl ethers, or vinyl halides; or is a partial hydrolysis product of any of the said copolymers.

7. The composition of claim 1 wherein the inert additive is added in an amount from about 40 percent to about 60 percent by weight and the amount of water varies from about 1 percent to about 10 percent by weight.

8. A new and improved method for preparing solutions of high molecular weight flocculant polymers or copolymers in water, for use in treating water and waste systems, which consists essentially of blending the flocculant in free-flowing powder form with an inert additive in free-flowing powder form and a small amount of water; wherein based on weight of flocculant, the inert additive is about 10 percent to 80 percent and the amount of water is about one-tenth percent to twenty percent; and adding the resulting combination as a free-flowing powder to water; said combination slowing the rate of solution of the polymer or copolymer, thereby improving the dispersion of the particles of said polymer or copolymer.

9. The method of claim 8 wherein the flocculant is selected from the group consisting of polyacrylamide, polystyrene sulfonate, or polyethylene oxide, having a molecular weight of about 0.1 to about 20 million.

10. The method of claim 8 wherein the inert additive is selected from the group consisting of sodium chloride, sodium sulfate, soda ash, sodium sulfite, magnesium sulfate, and sodium bisulfate.

11. The method of claim 8 wherein the small amount of water is added to the flocculant in the liquid or gaseous form.

12. The method of claim 8 wherein the flocculant is selected from the group consisting of polyacrylamide, polymethacrylamide, the water soluble salts of polyacrylic or polymethacrylic acid, and copolymers of acrylamide or methacrylamide with cationic polyacrylates or with vinylic monomers.

13. The method of claim 8 wherein a flocculant copolymer is prepared from a monomer selected from the group consisting of acrylamide and acrylates by copolymerization of the monomers, or is a copolymer of acrylamide or an acrylate with a vinyl compound selected from the group consisting of vinyl alkyl ethers and vinyl halides.

14. The method of claim 13 wherein based on weight of polymer, the inert additives is added in amounts from about forty percent to about 60 percent by weight and the amount of water varies from about 1 percent to about 10 percent by weight.

* * * * *